Oct. 10, 1933.                M. SKOKOWSKI                1,929,906
                              FROZEN CONFECTION
                              Filed June 16, 1930
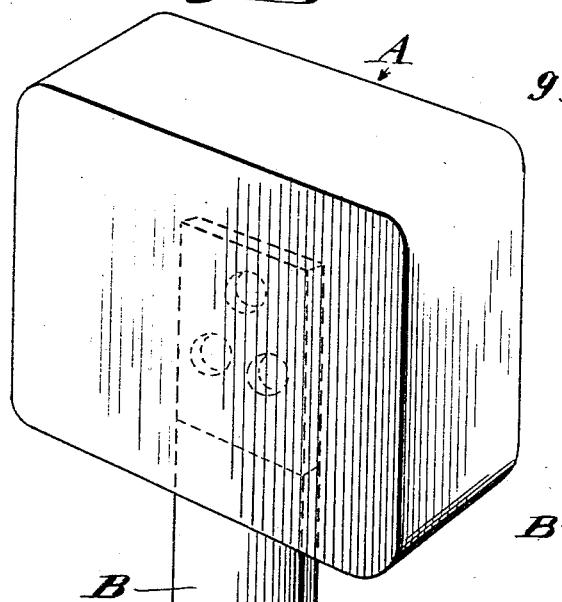
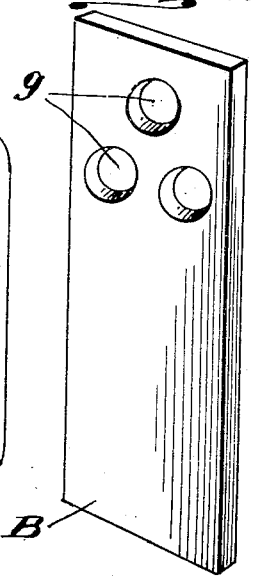
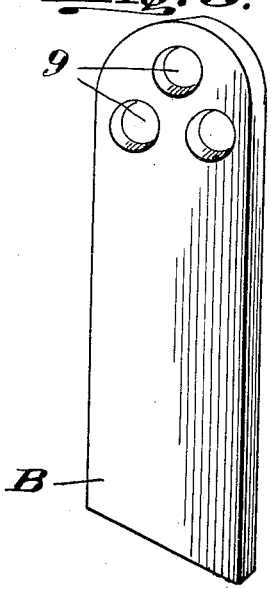
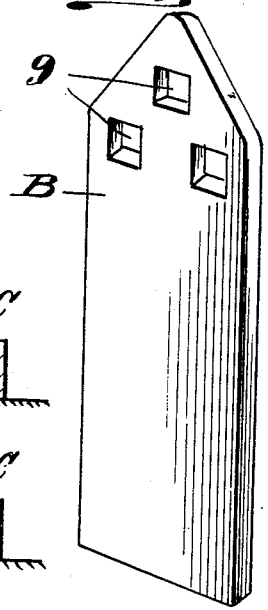
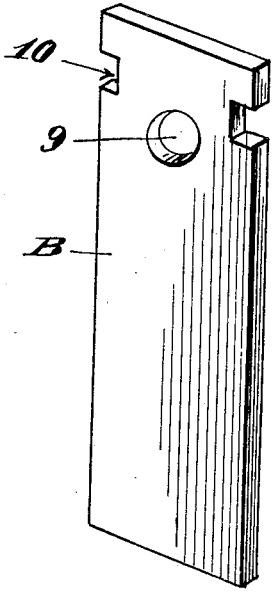
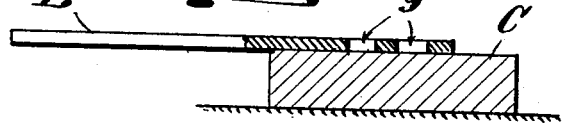
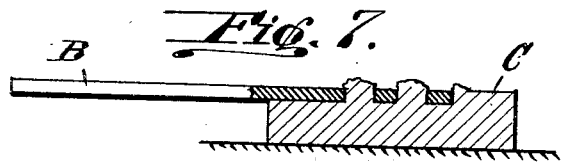
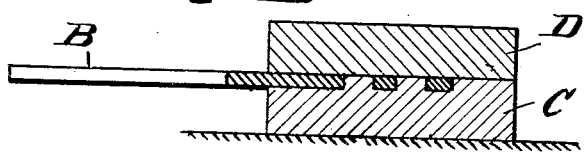
Inventor,
Mary Skokowski
By R. S. Burt
Atty.

Patented Oct. 10, 1933

1,929,906

UNITED STATES PATENT OFFICE 1,929,906

FROZEN CONFECTION

Mary Skokowski, Los Angeles, Calif.

Application June 16, 1930. Serial No. 461,286

1 Claim. (Cl. 99—16)

This invention relates to a frozen confection and more particularly pertains to that type of frozen confection embodying a handle portion and a frozen edible body carried thereon. Heretofore it has been common practice to form frozen confections of the above character by freezing a potable liquid such as is employed in the manufacture of ice-creams, sherbets, and the like, onto a stick immersed therein during the freezing operation and which process ordinarily involves the employment of molds or forms in which the liquid to be frozen is placed together with a stick arranged with one end thereof submerged in the liquid. The sticks usually employed are formed of wood of comparatively small cross section which, where the frozen edible body is of comparatively small size, proves satisfactory as a handle or carrier for the frozen confection, but is only practical within limits of size of the edible body.

An object of the present invention is to provide a method of forming such confections whereby the practice of freezing the liquid onto the handle may be obviated and whereby the confection may be formed by merely affixing a previously formed body of frozen liquid onto the handle.

Another object is to provide a handle for frozen confections so formed as to be suitable for use on frozen bodies of larger size than can be practically carried on the comparatively small sticks now generally used and whereby a more substantial handle for the confection is afforded.

Another object is to provide a handle which is so formed as to effect an anchorage with the frozen body carried thereon and whereby the possibility of the frozen body being accidently dislodged from the handle will be reduced to a minimum.

Another object is to provide a handle for frozen confections which may be formed of a sheet fibrous material such as paper, thereby producing a handle of superior qualities at a low cost of manufacture.

With the foregoing objects in view, together with such other objects and advantages as may subsequently appear, the invention resides in the steps and features and in the parts and construction of parts hereinafter described and claimed and illustrated by way of example in the accompanying drawing, in which:—

Fig. 1 is a perspective view of a frozen confection as formed in accordance with the invention;

Fig. 2 is a perspective view of the handle employed in the construction shown in Fig. 1, showing it as detached;

Figs. 3, 4, and 5 are perspective views illustrating modified forms of the handle;

Figs. 6, 7, and 8 are diagrams in section illustrating the manner of forming a frozen confection in accordance with the invention.

Referring to the drawing more specifically A indicates generally a frozen edible body and B indicates a handle affixed thereto by having one end portion thereof embedded therein.

In carrying out the invention, the handle B is formed of a sheet fibrous material such as paper or card board of sufficient thickness and width to afford desired rigidity; the handle being formed of an elongated rectilinear cross section whereby it will have a transverse width greatly exceeding its thickness and whereby the handle is formed with broad opposed surfaces adapted to receive advertising matter and other imprinted indicia. Furthermore the handle thus formed is characterized by having sufficient width to facilitate its being readily grasped and also to afford a broad surface on the portion thereof embedded in the frozen body whereby a considerable area of contact and adhesion between the surfaces of the handle and the frozen body is attained thus providing a substantial connection between the handle and the frozen body. The fibrous handle thus formed is coated with wax to render it sanitary and impervious to moisture.

As a means for affording an anchorage between the handle and frozen body to minimize the possibility of accidental withdrawal and disengagement of the handle from the frozen body, the end portion of the handle embedded in the frozen body may be perforated with one or more openings 9, and may be formed with marginal notches 10 as shown in Fig. 5, but in some instances it may be imperforate.

The end of the handle embedded in the frozen body may be of any desired configuration; for example, it may be rectangular as shown in Fig. 2, or semi-circular as shown in Fig. 3, or tapered as shown in Fig. 4, or T-shaped as shown in Fig. 5. The openings 9 may be of any desired form in outline such, for example, as circular as shown in Fig. 5, or rectangular as shown in Fig. 4, and they may be disposed in any suitable arrangement.

While the handle, constructed in accordance with the invention, may be positioned within the frozen body in various manners, it particularly lends itself for use in the method illustrated in Figs. 6, 7, and 8 which in accordance with the present invention consists as shown in Fig. 6, in initially positioning the handle B on top of a slab C of a previously frozen body, such as ice-cream or sherbet, which body has been frozen sufficiently to maintain the desired shape during the operation of affixing the handle thereto but which is sufficiently soft to permit the handle being pressed into the frozen body as shown in Fig. 7 and thereby cause portions of the frozen body to be forced into or through the openings 9. A second slab D of the frozen body is then positioned over the handle and pressed into place; the bodies C and D then adhering together throughout their contiguous surfaces and also adhering to the surfaces of the handle contacting therewith. By thus forming the frozen confection, the slabs C and D may be of different character, for example, one may comprise an ice or sherbet and the other an ice-cream, or they may consist of slabs of ice-cream or ices of different flavors.

The confection may thus be assembled on the handle at the time of dispensing same or they may be manufactured in quantity and preserved for marketing by packing in a suitable refrigerator.

An alternative method of applying the handle to the frozen confection, consists in first forming a slab of the frozen confection of desired shape, then thrusting the apertured end of the handle thereinto; the frozen body being then slightly pressed on opposite sides of the handle to force portions thereof into the anchorage apertures.

It is manifest, however, that the handle and the edible frozen body may be assembled together by freezing the edible body thereon, in which event a liquid to be frozen is placed in a suitable mold and the handle partly submerged therein and held in place, whereupon the liquid may be frozen in the mold in the usual manner.

I claim:

The method of forming a frozen confection consisting in taking a preformed slab of an edible frozen substance, impressing on one face of said slab one end portion of a flat strip of waxed fiber board with said end portion overlying said slab a major portion of the width thereof and with the other end portion protruding from the margin of the slab to form a flat handle, said slab being frozen sufficiently to maintain its shape, then pressing a second slab of a frozen substance on the first named slab and in contact with the end portion of the flat strip overlying said slab to cause said slabs to adhere together throughout their contiguous surfaces and also to the surfaces of the strip contacting said slabs.

MARY SKOKOWSKI.